United States Patent [19]

Tarr et al.

[11] Patent Number: 5,073,397

[45] Date of Patent: Dec. 17, 1991

[54] METHOD FOR PREPARATION OF ULTRAFINE CITRUS FIBER AND DERIVATIVE FIBER-ENRICHED CITRUS BEVERAGES

[75] Inventors: Robert E. Tarr; Alice L. Burkes, both of Cincinnati, Ohio; Susie H. Mills, Fort Thomas, Ky.

[73] Assignee: Procter & Gamble Company, Cincinnati, Ohio

[21] Appl. No.: 552,280

[22] Filed: Jul. 12, 1990

[51] Int. Cl.$^5$ .............................................. A23L 2/02
[52] U.S. Cl. .................................. 426/599; 426/590
[58] Field of Search ............................. 426/599, 590

[56] References Cited

U.S. PATENT DOCUMENTS

| | | | |
|---|---|---|---|
| 3,966,984 | 6/1976 | Cocke | 426/616 |
| 4,163,807 | 8/1979 | Jackman | 426/599 |
| 4,225,628 | 9/1980 | Lynn | 426/616 |
| 4,232,049 | 11/1980 | Blake | 426/616 |
| 4,335,143 | 6/1982 | Wiener et al. | 426/50 |
| 4,374,865 | 2/1983 | Strobel | 426/599 |
| 4,413,017 | 11/1983 | Loader | 426/616 |
| 4,439,458 | 3/1984 | Puri | 426/422 |
| 2,086,911 | 10/1984 | Eisenhardt et al. | 426/590 |
| 4,477,481 | 10/1984 | Eisenhardt | 426/616 |
| 4,690,827 | 9/1987 | Kupper | 426/599 |
| 4,923,981 | 5/1990 | Weibel | 426/615 |
| 4,946,702 | 8/1990 | Stipp | 426/599 |

FOREIGN PATENT DOCUMENTS

| | | | |
|---|---|---|---|
| 0296144 | 6/1988 | European Pat. Off. | 426/599 |
| 58-101667 | 6/1983 | Japan | 426/599 |

OTHER PUBLICATIONS

Van Deventer-Schriemer and Pilnick, Acta Alimentaria, vol. 16 (2), pp. 143–153, 1978.
Kesterson and Braddock, Food Technology, 1973, pp. 50, 52 and 54.
Baker and Bruemmer, J. Agr. Food Chem., vol. 20, No. 6, 1972, pp. 1169–1173.
Baker and Bruemmer, The Citrus Industry, vol. 51, No. 1, 1970, pp. 6–11.
Fellows, Food Processing Technology, Ellis Horwood Series, pp. 88–107 (1988).

*Primary Examiner*—Carolyn Paden
*Attorney, Agent, or Firm*—Rose Ann Dabek; Jerry J. Yetter; Richard C. Witte

[57] ABSTRACT

Method or process in which the size of de-juiced natural citrus fiber is very significantly reduced by particularly defined milling operations including a chopping step and a grinding step so that 90% or more of the citrus fiber feedstock has a particle size below about 50 microns, preferably 30 microns, and in which the size-reduced fiber is then mixed into a juice or juice-based beverage. The preferred process pre-treats the feedstock by means of a special separator to improve the flavor.

12 Claims, 3 Drawing Sheets

METHOD FOR PREPARATION OF ULTRAFINE CITRUS FIBER AND DERIVATIVE FIBER-ENRICHED CITRUS BEVERAGES

FIELD OF THE INVENTION

This invention relates to the manufacture of citrus beverages, especially orange juice. More particularly, the invention relates to a method or process in which the size of de-Juiced natural citrus fiber is very significantly reduced by particularly defined drying and milling operations. The very fine size-reduced fiber is then mixed into a juice or juice-based beverage, preferably orange juice.

BACKGROUND OF THE INVENTION

The milling or grinding of citrus fiber is generally known in the art. Notably, it is common to lime citrus mill effluents, the peel, rag, seed, pulp etc., to dewater them and to mill or at least chop them prior to kiln-drying and sale as animal-feed. Such effluents are often even disposed of, by incineration or other means. They are also used as fertilizer.

It is generally known in the art to make citrus albedo flour, pectin thickeners or similar solids for use in foods from the citrus effluent.

Moreover, it has previously been disclosed that the size of citrus particles suspended in juices or beverages can be reduced by all manner of methods involving a substantial amount of a liquid phase, e.g., homogenization, colloid milling, high-shear mixing etc. The liquid phase can be water or juice.

General background in connection with art-known processes for making citrus fiber is available in "Citrus Science and Technology", Ed. Nagy, Vols. 1 and 2, AVI Publishing Co. Inc., 1977. This classic reference teaches, at least in the context of preparing citrus beverages, that there are serious flavor-related problems involved in adding size-reduced rag or core material.

Wasting a significant fraction of citrus fiber which might in principle be incorporated into whole juices or beverages for human consumption is a practice which has continued. This may be for lack of an economically viable alternative or because of consumer dissatisfaction with attempted solutions. In any event, the consumer's increasing awareness of the benefits of natural fiber in the human diet mandates a way to increase the fiber content of beverages. On the other hand, it is known that consumers tend to dislike citrus juices or beverages into which large amounts of pulp are incorporated, at least in part due to organoleptic problems associated with such highly pulpy Juices or beverages. Organoleptic problems frequently encountered are grittiness, high viscosity and off-flavor.

Accordingly, it is an object of the present invention to overcome problems, believed to be hitherto unsolved, relating to recovery and size-reduction of natural citrus fiber, so that it can be incorporated into citrus Juices, such as orange juice, or into other fruit juices or beverages thereby providing a healthier drink in an economically attractive way without consumer dissatisfaction on grounds of flavor or texture.

SUMMARY OF THE INVENTION

As noted, this invention relates to a method for producing a citrus fiber product which is a very fine powder. In more technical terms, the product fiber generally has a substantially dry, fine particulate form. This fiber is especially adapted for addition to a citrus juice or beverage to increase the fiber content thereof, both in the general sense of citrus fiber as understood by citrus engineers, and in the more particular sense of dietary fiber as understood by dieticians. Beverages containing the fiber are without an unacceptably high viscosity, off-color or off-taste.

The method of the invention involves (a) providing a citrus fiber feedstock (the invention has embodiments in which the composition of this feedstock benefits greatly from the use of a particular kind of machine heretofore only known as a seed-separator) and (b) two special drying/grinding operations using particular kinds of mill heretofore more commonly known outside the citrus arts.

The citrus fiber feedstock required herein must be of a quality fit for human consumption. At the same time, such fiber feedstock is very difficult to dry and grind. It is very flexible (pliable or non-friable) on account of being wet and unlimed. For comparison, liming citrus effluents for animal feeds as done in the art helps dewater the effluent and make it tougher or more easily grindable. Because it is undesirable to adulterate the present feedstock by chemical treatments such as liming, the flexibility problem remains, and it is indeed very difficult to deal with.

However produced and whatever the theory, the citrus fiber feedstock required for this invention generally comprises from about 60% to 99.99% citrus membrane. More preferably this corresponds to about 68%, or higher. The feedstock further comprises from about 0.01% to about 40% peel. The high upper limit (40%) on the weight percentage of peel actually corresponds with a relatively low volume fraction of peel in the feedstock, since the peel is rather dense. For purposes of comparison, fresh de-juiced oranges typically comprise about 80% peel by weight. The feedstock when derived from citrus fruits other than seedless varieties also further comprises from about 0.001% to about 10% seed, preferably from about 0.001% to about 2%. Juice solids and natural water which generally are stongly adherent to the membrane at this stage are counted in the foregoing membrane weight %. Preferably, the citrus fiber feedstock is provided from fresh oranges by means of an FMC extractor, a centrifuge and a Kolodesh Separator as described in further detail hereinafter.

There follows (b) at least one primary operation of chopping and concurrent drying the citrus fiber feedstock followed sequentially by classifying (preferably using a static classifier); said primary operation at least partially reducing the size of the feedstock and reducing the moisture content of the feedstock to the extent that the chopped feedstock has a moisture content of no more than about 15%, preferably no more than about 12%. This operation is achieved by means of a first carrier-gas-swept mill having chopping blades, a classifier (preferably, the static type, as noted) and recycle means. The carrier gas generally has a carrier gas inlet temperature to the first mill (may be briefly referred to as "CGITI") which is in the range from about 120° C. to about 250° C., preferably from about 150° C. to about 200° C. The carrier gas at this stage also has a carrier gas inlet flowrate to the first mill (may be briefly referred to as "CGIFI") of from about 100 cubic feet per minute per pound feedstock to about 2000 cubic feet per minute per pound feedstock; preferably CGIFI is from about 200 cubic feet per minute per pound feedstock to about 1000 cubic feet per minute per pound of the citrus fiber feedstock. Moreover, the first mill operates under a first mill recycle load (may be abbreviated as "RLI") of from about 0.2 pounds per pound chopped feedstock to about 5 pounds per pound of chopped feedstock. Preferably RLI is from about 0.5 pounds per pound to about 3 pounds per pound.

There now follows (c) at least one secondary operation of grinding, optionally with concurrent drying, followed sequentially by dynamic classifying. The secondary operation takes the chopped feedstock, i.e., the product of operation (b), to a final ultra-fine particle size characteristic of the citrus fiber product of the invention. More specifically for the present purposes such a particle size is in the general range from about 50% to about 90% less than 50 microns, preferably from about 60% to about 95% less than 30 microns. This secondary size-reduction operation is achieved by means of a second carrier-gas-swept mill having hammers, a dynamic classifier (note that the dynamic type is essential at this stage) and recycle means. The carrier gas has a carrier gas inlet temperature to the second mill (may for brevity be referred to as "CGIT2") which is less than about 120° C., preferably from ambient (e.g., about 20° C.) to about 80° C.; In the second mill, the carrier gas (which is otherwise typically similar to that used in the first stage) has a carrier gas inlet flowrate to the second mill ("CGIF2") of from about 80 (preferably about 100) cubic feet per pound of chopped feedstock to about 2000 (preferably about 1000) cubic feet per pound of chopped feedstock.

The invention has other preferred embodiments and ramifications, as illustrated by a method wherein the citrus fiber feedstock used as the starting-material to the first mill is the product of a Kolodesh Separator which can be used in operation (a) as more fully described hereinafter. Indeed the successful and novel use of what was previously regarded as a only a seed-separator in a method for improving the flavor of ultra-fine ground citrus fiber comprising treating a feedstock for the production of the ground fiber in a Kolodesh separator, thereby reducing the peel content thereof, is considered to be only one of the new and useful features of the invention.

In the product embodiments the invention encompasses the ultra-fine citrus fiber powder and the whole range of citrus Juices or beverages which can be secured by simple addition of the fiber to a suitable citrus Juice or beverage base, very preferably under low-shear conditions. This includes single-strength juice, e.g., single-strength orange juice, having good flavor and color and, without undesirably high viscosity, a total dietary fiber (AOAC Method) of from about 0.7 grams to about 1.2 grams per serving, or even from about 1.25 grams per serving to about 2 grams per serving or higher.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings.

DESCRIPTION OF A PREFERRED EMBODIMENT

Figure 1:
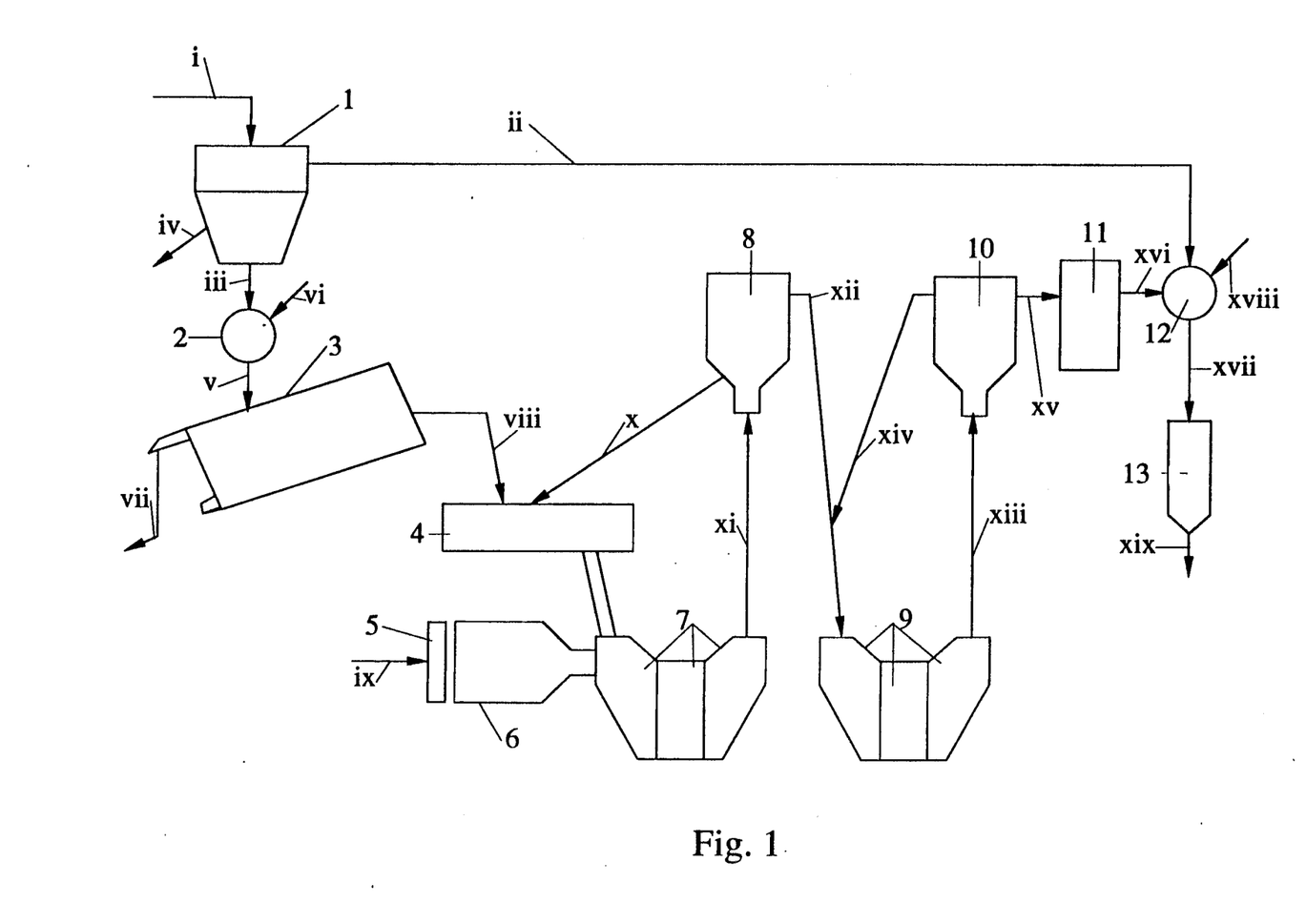
FIG. 1 is a diagram of a preferred embodiment of the process used to provide, and reduce the size of, citrus fiber feedstock all in accordance with the invention and to incorporate the size-reduced fiber into a juice or beverage.

All percentages and proportions herein are by weight, unless otherwise specifically indicated. Referring now to FIG. 1, the components of the processing equipment are as follows:

(I) in general, means for providing a wet, flexible, edible, unlimed citrus fiber feedstock, as more specifically illustrated by:

1 juice extraction means, preferably FMC-type citrus extractor, e.g., Model No. 391, FMC Corp., Citrus Machinery Services Division, Fairway Ave., Lakeland, FL. 33802; note that it is deemed important herein that the juice extraction means should be of high quality and well-matched to the size of the fruit so as to avoid, to the extent practical, having excessive peel-oil contamination of the juice and fiber;

2 means for removing residual juice from extractor core material, preferably centrifugal separator, e.g., Model No. H-520, TEMA Systems Inc., 11584 Gold Coast Dr., Cincinnati OH 45249; alternatively, centrifuges may be had from Sieb Technik GmbH, Mulheim, Germany or, much less desirably, a water-wash unit can be used with or without centrifuge;

3 means for further reducing the level of seed and peel plugs in the de-Juiced extractor core material, e.g., vibrating deseeder, preferably Kolodesh Separator as further described hereinafter; this unit is greatly preferred for peel level control purposes, but inasmuch as seed level control is concerned, e.g., when the extractor core material is derived from seedless oranges, would not even be essential; means 1-3 work co-operatively for providing citrus fiber feedstock, including for reducing the fraction of peel plugs so as to conform with the specified feedstock composition;

4 citrus fiber feedstock transport means, preferably conveyor; the precise transport means are not important for the successful operation of the invention;

(II) in general, means for conducting a primary operation of chopping and concurrent drying followed sequentially by static classifying the citrus fiber feedstock; these means preferably comprise:

5 means for filtering carrier gas (e.g., air), preferably a conventional low pressure-drop air filter;

6 means for heating carrier gas, preferably steam-heated coils;

7 means for chopping/drying citrus fiber feedstock, preferably IMP mill, A.B.B. Raymond, formerly C-E Raymond, 650 Warrenville Rd., Lisle, ILL 60532, particularly equipped with knife-type chopping blades;

means for separating chopped dried citrus fiber feedstock from oversized relatively undried citrus fiber, preferably static classifier, especially static cone classifier; means 5-8 work co-operatively to achieve a first-stage drying/chopping of the feedstock;

(III) in general, means for fine grinding the first stage dried/chopped fiber, optionally with concurrent drying followed sequentially by dynamic classifying; preferably illustrated by:

9 means for grinding/drying chopped citrus fiber, preferably IMP mill, A.B.B. Raymond, formerly C-E Raymond, particularly equipped with hammers, especially swing-hammers;

10 means for separating ground dried chopped citrus fiber from oversized partially ground dried chopped citrus fiber, preferably dynamic classifier, more particularly turbine classifier;

(IV) in general, means for separating the air from the product citrus fiber, e.g., 11 air-dust filtration means, preferably bag-house; (V) in general, means for adding product citrus fiber to citrus juice concentrate or single-strength juice, more particularly:

12 high-shear mixing means, e.g., Tri-Clover Tri-Blender, Tri-Clover Inc., Kenosha, Wisconsin, 53141.

(VI) in general, means for pasteurizing or sterilizing fiber-supplemented juice, e.g., 13 Sterilization unit, e.g., U.H.T. or H.T / S.T unit. Also with reference to FIG. 1, the process streams are as follows:

(i) citrus fruit, preferably oranges;
(ii) primary juice stream;
(iii) extractor core material;
(iv) peel stream;
(v) de-juiced extractor core material;
(vi) when present, water for water-wash in (2);
(vii) seed-rich and peel-plug-rich stream;
(viii) wet, flexible, edible, unlimed citrus fiber feedstock;
(ix) air or alternate gas, e.g., nitrogen;
(x) oversized relatively undried citrus fiber;
(xi) chopped and at least partially dried citrus fiber;
(xii) classified chopped dried citrus fiber;
(xiii) ground chopped dried citrus fiber;
(xiv) oversized partially ground dried chopped citrus fiber;
(xv) airborne ground dried chopped citrus fiber;
(xvi) ground dried chopped citrus fiber;
(xvii) fiber-supplemented juice;
(xviii) optional additives, e.g., vitamins, minerals, essences and oils.
(xix) finished fiber-supplemented beverage.

While the invention is described in connection with the above-outlined preferred embodiment as illustrated in FIG. 1, it should be understood and appreciated that it is not intended to thereby limit the invention to such embodiment. On the contrary, it is intended to cover all alternatives, modifications and equivalents as may be included within the spirit and scope of the invention as defined by the specification and the appended claims.

In more detail, the process of the present invention is directed at the difficult problem of providing dried chopped ground citrus fiber having substantially dry fine particulate form (less than 50 microns) without a need for chemical treatments such as liming.

Owing to the absence of liming or other chemical treatments, the feedstock is desirably "natural" and suitable for human consumption as contrasted with conventional citrus mill effluents which are generally not. At the same time, the present feedstock is remarkably difficult to dewater. It cannot for example efficiently be pressed, which is the normal practice for limed citrus effluent.

Although in theory, such a feedstock could be dried by freeze-drying, cryogenic methods or the like, such processes are generally expensive and low in throughput. Moreover, although in theory, such a feedstock could be ground or milled, grinding or milling turn out in practice to be very difficult to achieve owing at least in part to the flexible (as distinct from brittle) character of the natural unlimed citrus fiber.

It might seem obvious in theory to try a relatively inexpensive process, such as some vaguely conceptualized drying/milling operation. However, it has been discovered that, especially in the general case of a citrus fiber feedstock which has not been water-washed, the feedstock is very heat-sensitive.

Thus, numerous milling trials can be carried out in which the milled fiber is bitter and/or papery and/or generally dark and unpleasant-tasting. The present invention solves such problems, and, since the resulting dried chopped ground citrus fiber can readily be incorporated into citrus juices or beverages which are organoleptically pleasing to the consumer, the invention is considered to have appreciable merit both in its process and product embodiments.

CITRUS FIBER FEEDSTOCK

As noted, the invention starts not from citrus mill effluent but from the provision of a particularly defined citrus fiber feedstock. In general, this feedstock can be citrus pulp, preferably unwashed, or, better, can be derived from extractor core material. The feedstock is a wet (typically from about 50% to about 85% water) flexible, edible, unlimed citrus fiber feedstock, comprising from about 60% to about 99.99%, preferably from about 68% to about 99.99% citrus membrane (this membrane may include varying amounts of juice vesicles or juice sacs). Also present in the feedstock is from about 0.01% to about 40%, preferably from about 0.01% to about 30% peel. When seedless citrus fruit is used as a source of the feedstock, there will not be any seed present. However, when the feedstock is from a seed-containing source of citrus fruit, the seed content of the feedstock is generally from about 0.001% to about 10%, preferably from about 0.001% to about 2% seed. The citrus fiber feedstock generally contains variable amounts of water-extractable juice solids in the membrane or pulp.

The preferred fruit for use herein is oranges. As used herein, "Valencia orange fruit" refers to orange fruit from the genotype or variety Valencia, which usually mature relatively late in the harvest season as compared with other citrus fruit. Examples of suitable Valencia fruit include Florida Valencia fruit, California Valencia fruit, and Brazilian Valencia fruit.

Examples of other suitable orange fruits include the Florida Early-Mid season oranges (Hamlin, Parson Brown and Pineapple), Brazilian varieties such as Pera Rio and Natal, as well as Tangerines, Mandarin Oranges and Blood Oranges.

Other citrus fruits that can be used in this process include grapefruit, lemons, limes, and similar citrus fruits.

Although the instant process can make use of fresh unwashed pulp or other citrus feedstocks conforming with the above-identified compositional requirements, the citrus fiber feedstock is best prepared by extracting the whole citrus fruit, preferably fresh, free from spoilage and well-matched to the size of the extractor cups, in an FMC-type juice extractor which separates the fruit into a peel stream, a primary juice stream and extractor core material, which is a relatively membrane-rich stream. As noted, care is taken to minimize contamination of the juice and fiber by excessive amounts of peel oil. As is well-known in the art, matching the size of the fruit to the extractor cups is important; also, the use of relatively newer FMC extractor models is believed to be preferred. Now preferably, the membrane-rich stream is further centrifugally de-juiced, for example by means of a CONTURBEX centrifuge manufactured by Siebtechnik G.m.b.H of Mulheim, Germany. The peel content (FMC extractor plugs) and seed content of the de-juiced extractor core material, if they fall outside the herein indicated composition ranges for an acceptable feedstock (which it appears is generally the case) are now reduced using a "Kolodesh separator", a detailed description of which is given in a separate section of this specification. Advantages of using this separator include achieving better control of limonene content of the citrus fiber feedstock, so that it conforms fully with limits imposed by regulation. Alternately, any conventional vibratory de-seeder may be used to bring the seed content to within the above-prescribed limits, but in this less desirable situation, it is possible that the peel content will have to be manually reduced to within the above-prescribed limits. As distinct from the treatment of citrus mill effluents, which generally involves taking the combined solid wastes of citrus processing (notably including the peel stream) and liming / drying / milling those wastes, the present process does not further use the peel stream.

The citrus fiber with its peel and seed content as prescribed hereinabove and as secured by means of the above-described process steps is now in the form of a satisfactory citrus fiber feedstock, shown as viii in FIG. 1. It can be further water-washed at various stages in the process e.g., by substituting a water-wash unit instead of the preferred centrifuge at 2 in FIG. 1 if desired; however it is preferable to rely only on having centrifuged the feedstock as taught hereinabove, without any water-washing: this ensures the citrus fiber feedstock is not adulterated, however marginally, by a water-wash. Although it is desirable to avoid water-wash, non-water washed feedstock is considerably more difficult to dry, chop and grind, it being a major advantage of the instant process to overcome this problem.

Without being limited by theory, the operations of chopping, concurrent drying and static classifying which now follow and are central to the instant process have as their principal object a size reduction of the citrus fiber feedstock to ultra-fine (micron-size range) particles traditionally very difficult to achieve outside a colloid mill. Colloid mills are, of course, not a practical method for achieving size-reduction, however satisfactory, on the scale of operation and with the economics made possible by the present invention. Without being limited by theory, it is thought that size reduction according to the present invention operates significantly differently from colloid-milling and the like wherein, due to the presence of a liquid phase in very substantial proportions, there can be an uncontrolled release of pectins concommitant with the size reduction and a major thickening effect in the final beverage.

According to the present invention, the citrus fiber feedstock is subjected to a primary operation of chopping and concurrent drying followed sequentially by static classifying to the extent that the chopped feedstock has a moisture content of no more than about 15%, preferably no more than about 12% and, very preferably, a particle size as indicated hereinabove.

This operation is achieved without any pressing by means of a first carrier-gas swept mill having chopping blades, a classifier (preferably, a static classifier) and recycle means. It is essential that the carrier gas have a carrier gas inlet temperature to the first mill, CGIT1, which is in the range from about 120° C. to about 250° C., preferably from about 150° C. to about 200° C., a carrier gas inlet flowrate, CGIF1, to the first mill of from about 100 to about 2000, preferably from about 200 to about 1000 cubic feet per minute per pound of the citrus fiber feedstock, and that the first mill should operate under a first mill recycle load, RL1, of from about 0.2 to about 5, preferably from about 0.5 to about 3 pounds per pound of chopped feedstock. Operating outside these critical limits is found to result in all manner of disadvantages, for instance, operating above the indicated temperatures tends to result in excessive browning, burning and off-flavor generation; operating below the specified temperature range results in excessive carrier gas load and inefficient drying; operating with insufficient carrier gas inlet flowrate tends to result in insufficient fluidization of the feedstock and plugging of the mill; operating with excessive carrier gas flow can result in push-through of insufficiently chopped fiber particles to the second mill where on account of not being properly chopped and dried, the hammer action will not function satisfactorily; operating at too low a recycle load will likewise result in excessive push-through with similar adverse consequences; and operating with too high a recycle load results in excessive heat exposure and consequent off-flavor generation. Unless controlled as prescribed in the manner of the instant invention, these problems may even impact on the successful operation of the entire process.

After the primary chopping/drying operation has been carried out, there follows at least one secondary operation of grinding, optionally (albeit preferably) with further concurrent drying; followed sequentially by dynamic classifying. This secondary operation takes the chopped feedstock produced in the first stage to a final particle size at the end of the second milling stage which is in the range from about 50% to about 90% less than 50 microns, preferably from about 60% to about 95% less than 30 microns. This excellent size-reduction is accomplished first and foremost by the pre-treatment in the first mill which, without being limited by theory, is believed to significantly embrittle and partially size-reduce the citrus fiber so that it can more successfully be treated in the second mill; second, by equipping the second carrier-gas swept mill with hammers, typically of the swinging variety, and thirdly, by the second mill having a dynamic classifier and recycle means. The operating conditions in the second mill are critical, as are those in the first mill. Thus, the carrier gas has a carrier gas inlet temperature to the second mill, CGIT2, which is less than about 120° C., preferably from about ambient temperature (e.g., about 20° C.) to about 80° C. Without being bound by any particular theory of operation, it is believed that running the second mill cool in this fashion permits a relatively larger recycle load without thermal degradation of the product; and that having the relatively large recycle load in the second mill in turn permits achieving the very fine particle sizes of the desired product. The second mill has a carrier gas inlet flowrate to the second mill, CGIF2, of from about 80 to about 2000, preferably from about 100 to about 1000 cubic feet per pound of chopped feedstock. As noted, the recycle load in the second mill can be large and is not critical in the sense that the low operating temperature permits wide variation. However, for best results, the preferred recycle load in the second mill, RL2, is from about 0.5 to about 10 pounds per pound of product.

CITRUS FIBER PRODUCT OF THE PROCESS

As noted, the present process results in very finely sized citrus fiber which has good color and does not have unacceptable off-flavor. Typically, the process produces a citrus fiber the particle size of which is in the range from about 60% to about 90% less than 30 microns and a final moisture content of not more than about 10%.

ADDITIONAL EMBODIMENTS AND RAMIFICATIONS OF THE INVENTION

It will be appreciated from the foregoing disclosure that the invention is not particularly limited in terms of the carrier gas used, although such gas is generally non-oxidizing. Non-oxidizing carrier gas or simple "carrier gas" within the meaning of the present invention encompasses air, nitrogen and argon. It is an advantage that air is acceptably non-oxidizing under the operating conditions described herein.

With respect to the carrier gas, it should also be noted that throughout the above-described operations, for best efficiency, the carrier gas preferably has a temperature at least 10° C. above its dewpoint.

The invention also encompasses embodiments comprising additional operations, over and above the above-described fiber feedstock preparation, chopping/drying and grinding. In a preferred embodiment, separation of the air or carrier gas from the product citrus fiber is carried out by conventional air / dust filtration means, e.g., using a baghouse the filters of which have regular openings with a nominal size of less than about 1 micron.

In another alternate embodiment of the invention, there is provided a method wherein said flexible, edible, unlimed citrus fiber feedstock is produced according to steps, in sequence, comprising:
(i) treating citrus fruit by means of a conventional citrus juice extractor to the extent of removing a juice stream comprising 50% or more of citrus juice and a peel stream comprising 80% or more of flavedo and albedo, thereby securing, as the balance of said citrus fruit, a membrane stream consisting essentially of a wet mixture of membrane, and residual pulp, peel and seeds;
(ii) without water-washing, centrifuging said membrane stream, thereby removing a secondary juice stream and securing a centrifuged membrane stream; and
(iii) concurrently reducing both the residual peel content and the seed content of said centrifuged membrane stream by means of a Kolodesh separator.

Yet another method in accordance with the invention has the citrus fiber feedstock produced according to steps, in sequence, comprising: treating citrus fruit by means of a conventional citrus juice extractor to the extent of removing a juice stream comprising 50% or more of citrus juice and a peel stream comprising 80% or more of flavedo and albedo, thereby securing, as the balance of said citrus fruit, a membrane stream consisting essentially of a wet mixture of membrane, residual pulp, peel and seeds; and, in any order, conventional water-washing, de-seeding and de-peeling steps relying on conventional water-washing, de-seeding and de-peeling means.

In the above embodiment, the process is carried out as taught hereinabove up to the air-removal from the product citrus fiber in the baghouse. Now there follows an additional step of adding the product citrus fiber to conventionally extracted single-strength citrus Juice. This Juice may be the primary juice from a FMC extractor as is (ii) in FIG. 1., or may be the juice secured for example by finishing and/or pasteurizing or homogenizing such juice. In yet another variation, the citrus fiber may be added to concentrated citrus juice.

A particularly desirable embodiment for maximizing the overall citrus fiber content of a citrus Juice results when the citrus fiber produced according to the method of this invention is added to a single-strength citrus juice comprising high-shear homogenized background pulp and wherein the addition of the finely divided citrus fiber of the invention is conducted with a minimum of shear sufficient to disperse it (e.g., in unit 12 of FIG. 1.) and is not followed by any further high-shear operations prior to packing and distributing the single-strength juice product. It should be noted that this procedure is counter to the conventional practice of adding fibers and thickeners to Juices, where maximum shearing is used for good dispersion with a consequence of producing hydration or rupture of the particles in the presence of juice, and as a result, maximum exposure of thickening components of the particles and maximum viscosity increases. The sense of the instant invention, in contrast, is to achieve a great size reduction of the citrus fiber feedstock outside of the juice or beverage, and then to blend the size-reduced fiber feedstock therewith.

The present invention also encompasses the various fiber-supplemented juices and beverages which may be achieved by the methods of the invention. Such beverages encompass single-strength citrus juice produced according to the above-described method and concentrated citrus juice produced according to the method. Single-strength citrus juice produced according to the method of the invention typically can be in two grades, such as a grade having a Total Dietary Fiber content (AOAC / Prosky) of from about 0.7 to about 1.2 grams per serving and a grade having a Total Dietary Fiber content of from about 1.25 to about 2 grams per serving.

ROLE OF THE KOLODESH SEPARATOR

Figure 2:
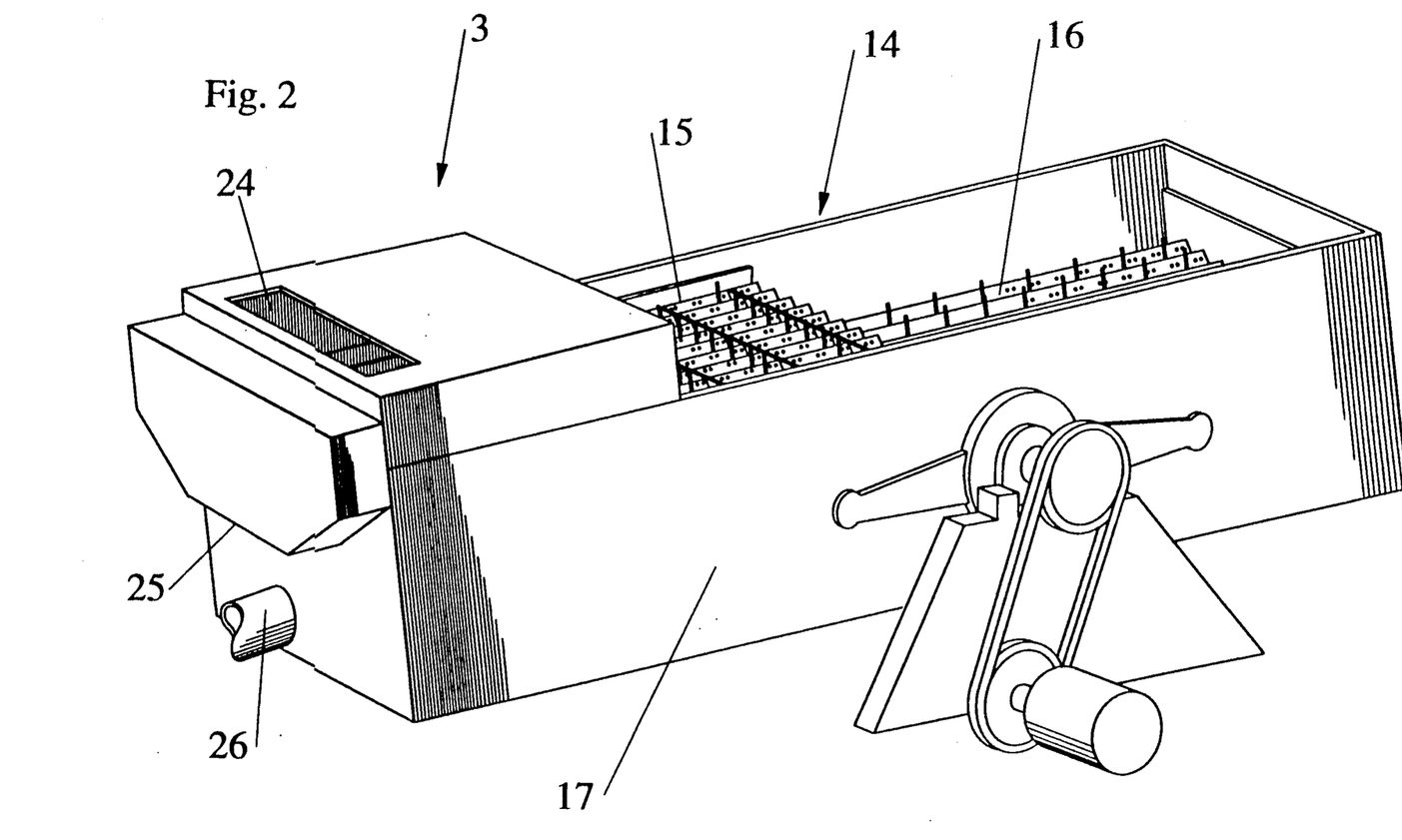
FIG. 2 is a schematic perspective view of a seed screening apparatus which will be termed a "Kolodesh Separator" herein.
Figure 3:
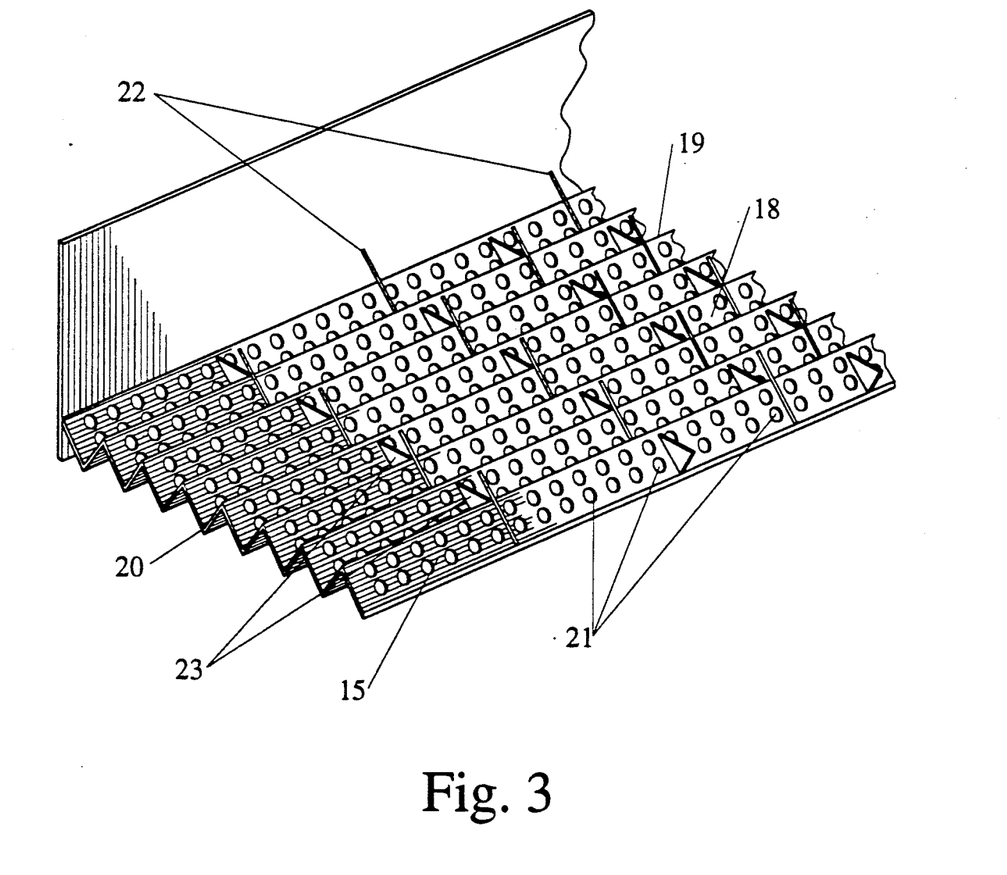
FIG. 3 is an enlarged schematic perspective view of a portion of the bed of the Kolodesh Separator illustrated in FIG. 2.

It is disclosed hereinabove that the Kolodesh separator is believed to be important for operating the instant invention in the best known manner. Without being limited by theory, it is believed that this separator effectively achieves not only excellent control over seed removal, but also, surprisingly, control over the content of peel plugs in the citrus fiber feedstock, in turn potentially improving the taste of the milled citrus fiber. Referring now to FIGS. 2 and 3, the apparatus generally indicated as 3 relies on high-frequency vibration and the differences in bouncing characteristics between seeds/peel plugs on one hand and citrus fiber (including core and other membrane) to separate the two. Of particular significance is that the Kolodesh separator does not cut or smash seeds and peel plugs and thereby does not release undesirable flavor elements. The removal of seeds and peel plugs in this manner also makes for easier conformance with regulations concerning peel oil and limonene content of the finished product in which the fiber is used.

In FIG. 2, the apparatus generally indicated as 3 includes an upwardly-inclined bed generally indicated as 14, that is preferably separated into upper bed section 15 and lower bed section 16 and a large vibrating base 17. Base 17 is a commercially available component that is used in the vibrating screen industry, for example model SELECTRO 245-2D-HBAS, available from SMICO MANUFACTURING of Oklahoma City, Oklahoma, U.S.A. Briefly, base 17 uses an eccentric ring and counterweights driven by a motor, sprockets and chain as shown, to simultaneously impart vertical and horizontal motion to the bed to separate the materials. The bed can be operated at speeds from between about 1000 and 1600 cycles per minute with eight different stroke settings ranging from between 0 and ⅜ inches.

Referring lo FIGS. 2 and 3, upper bed 15 and lower bed 16 include screen member 18 having a plurality of ridges 19 and valleys 20 that define separate channels extending the length of screen member 18. Screen member 18 is provided with a plurality of apertures, 21, therein that are preferably ⅛ inch in diameter. Note, however, that apertures 21 are not needed when the juice content of the feed is low. A plurality of pins 22 and dams 23 are attached to the upper surface of screen 18 and project upwardly therefrom. Apparatus 3 also includes an inlet port, 24, through which the citrus fiber feedstock is introduced and is fed onto the top surface of upper bed section 15. Apparatus 3 further includes discharge port 25 through which seeds and peel plugs separated from the citrus fiber exit and are collected, and discharge opening 26 through which (when the citrus fiber has not previously been subjected to centrifugal de-juicing) some juice may be collected (this aspect being non-essential, is not shown in FIG. 1).

In operation, the citrus fiber feedstock is fed into the Kolodesh separator of FIGS. 2 and 3 through inlet port 24. Preferably, the feedstock is evenly distributed onto the upper surface of upper bed section 15 of bed 14. The vibrating motion, i.e., high-speed horizontal and vertical movements imparted to upper bed section 15 by base 17 causes the citrus fiber to travel up inclined upper bed section 15 while the seeds and peel plugs bounce into the air. The bouncing seeds and peel plugs tumble down upper bed 15 and are discharged from apparatus 3 through discharge port 25. The improved citrus fiber emerging from apparatus 3, now satisfactory as a citrus fiber feedstock for the invention, is shown as viii in FIG. 1.

What is claimed is:

1. A method for producing product citrus fiber having substantially dry, fine particulate form, said product fiber being adapted for addition to a citrus juice or beverage to increase the fiber content thereof;
said method comprising the following steps, in the order indicated:
   (a) providing a wet, flexible, edible, unlimed citrus fiber feedstock comprising from about 60% to 99.99% citrus membrane, from 0.01% to about 40% peel, and from 0.001% to about 10% seed;
   (b) at least one primary operation of chopping and concurrent drying followed sequentially by classifying; said primary operation at least partially reducing the size of the feedstock and reducing the moisture content of the feedstock to no more than about 15%; said operation being achieved by means of a first carrier-gas-swept mill having chopping blades, a static or dynamic classifier and recycle means; wherein the carrier gas has a carrier gas inlet temperature to the first mill, CGITI, which is in the range from about 120° C. to about 250° C., a carrier gas inlet flowrate, CGIFI, to the first mill of from about 100 to about 2000 cubic feet per minute per pound feedstock; and said first mill operates under a first mill recycle load, RLI, of from about 0.2 pounds to about 5 pounds per pound of chopped feedstock; and
   (c) at least one secondary operation of grinding, optionally with concurrent drying; followed sequentially by dynamic classifying; said secondary operation taking the chopped feedstock produced in operation (b) to a final particle size in the range from about 50% to about 90% less than 50 microns; said operation being achieved by means of a second carrier-gas-swept mill having hammers, a dynamic classifier and recycle means; wherein the carrier gas has a carrier gas inlet temperature to the second mill, CGIT2, which is less than about 120° C.; and the second mill has a carrier gas inlet flowrate to the second mill, CGIF2, of from about 80 to about 2000 cubic feet per pound of chopped feedstock.

2. A method according to claim 1, wherein:
in step (a), the citrus fiber feedstock has a water content of from about 50% to about 85% and consists essentially of, on a wet basis, from 0.01% to about 30% peel, from 0.001% to about 2% seed and from about 68% to about 99.99% citrus membrane;
in operation (b), the classifier is a static classifier, the chopped feedstock particle size is taken to the range from about 75 % to about 95% less than 30 microns, the chopped feedstock moisture content is not more than about 12%, CGITI is in the range from about 150° C. to about 200° C., CGIFI is from about 200 to about 1000 cubic feet per minute per pound feedstock; and RLI is from about 0.5 to about 3 pounds per pound; and
in operation (c), the final particle size is in the range from about 60% to about 90% through 30 microns, the product has a final moisture content of not more than about 10%, CGIF2 is from about 100 to about 1000 cubic feet per minute per pound of chopped feedstock and CGIT2 is in the range from ambient to about 80 ° C. with a second mill recycle load, RL2, of from about 0.5 pounds to about 10 pounds per pound of product.

3. A method according to claim 2 wherein said carrier gas is air, and wherein throughout said operations, said carrier gas has a temperature at least 10° C. in excess of the dewpoint of said carrier gas.

4. A method according to claim 3 having an additional step, comprising (d) separating the air the product citrus fiber of operation (c) by conventional air dust filtration means.

5. A method according to claim 4 wherein said air dust filtration means comprise a baghouse the filters of which have regular openings with a nominal size of less than about 1 micron.

6. A method according to claim 5 wherein said flexible, edible, unlimed citrus fiber feedstock is produced according to steps, in sequence, comprising:

(i) treating citrus fruit by means of a conventional citrus Juice extractor to the extent of removing a juice stream comprising 50% or more of citrus Juice and a peel stream comprising 80% or more of flavedo and albedo, thereby securing, as the balance of said citrus fruit, a membrane stream consisting essentially of a wet mixture of membrane, and residual pulp, peel and seeds;

(ii) without water-washing, centrifuging said membrane stream, thereby removing a secondary juice stream and securing a centrifuged membrane stream; and (iii) concurrently reducing both the residual peel content and the seed content of said centrifuged membrane stream by means of a Kolodesh separator.

7. A method according to claim 6 wherein step (d) is followed by the additional step, (e), of adding the product citrus fiber to conventionally extracted and further processed single-strength citrus juice.

8. A method according to claim 6 wherein step (d) is followed by the additional step, (e), of -adding the product citrus fiber to conventionally extracted and further processed concentrated citrus juice.

9. A method according to claim 8 wherein said single-strength citrus juice comprises high-shear homogenized background pulp and wherein said additional step is a low-shear addition step not followed by any further high-shear operations prior to packing and distributing the single-strength Juice product.

10. A method according to claim 5 wherein said flexible, edible, unlimed citrus fiber is produced according to steps, in sequence, comprising:

treating citrus fruit by means of a conventional citrus juice extractor to the extent of removing a juice stream comprising 50% or more of citrus juice and a peel stream comprising 80% or more of flavedo and albedo, thereby securing, as the balance of said citrus fruit, a membrane stream consisting essentially of a wet mixture of membrane, residual pulp, peel and seeds; and, in any order, conventional water-washing, de-seeding and de-peeling steps relying on conventional water-washing, de-seeding and de-peeling means.

11. A method according to claim 1 wherein the citrus fiber feedstock is the product of a Kolodesh separator.

12. A method for reducing the limonene content of ultra-fine ground citrus prepared according to claim 1 comprising reducing the peel and seed plug content of a feedstock of step a using a Kolodesh separator.

* * * * *